US012799990B2

(12) United States Patent
Forster et al.

(10) Patent No.: US 12,799,990 B2
(45) Date of Patent: Nov. 17, 2026

(54) HIGH-PRESSURE HYDRAULIC CLUTCH COOLING SYSTEM FOR WORK VEHICLES

(71) Applicant: Deere & Company, Moline, IL (US)

(72) Inventors: Jonathan D. Forster, Wann, OK (US); Jeffrey S. Turner, Coffeyville, KS (US); Zachary Grunder, Independence, KS (US); Michael J. Cliff, Coffeyville, KS (US)

(73) Assignee: DEERE & COMPANY, Moline, IL (US)

(*) Notice: Subject to any disclaimer, the term of this patent is extended or adjusted under 35 U.S.C. 154(b) by 9 days.

(21) Appl. No.: 19/041,490

(22) Filed: Jan. 30, 2025

(65) Prior Publication Data

US 2026/0218761 A1 Jul. 30, 2026

(51) Int. Cl.

| | |
|---|---|
| ***F16D 48/06*** | (2006.01) |
| ***E02F 9/08*** | (2006.01) |
| ***E02F 9/20*** | (2006.01) |
| ***E02F 9/22*** | (2006.01) |
| ***F16D 13/72*** | (2006.01) |

(52) U.S. Cl.

CPC .......... *F16D 48/066* (2013.01); *E02F 9/0866* (2013.01); *E02F 9/202* (2013.01); *E02F 9/2217* (2013.01); *E02F 9/2221* (2013.01); *F16D 13/72* (2013.01); *E02F 9/2292* (2013.01); *F16D 2500/10412* (2013.01); *F16D 2500/1045* (2013.01); *F16D 2500/30404* (2013.01)

(58) Field of Classification Search

CPC ......... F16D 48/066; F16D 2500/10412; F16D 2500/1045; F16D 2500/30404

See application file for complete search history.

(56) References Cited

U.S. PATENT DOCUMENTS

| | | | | |
|---|---|---|---|---|
| 10,408,237 | B2 * | 9/2019 | Meehan | F15B 11/17 |
| 12,228,178 | B2 * | 2/2025 | Takagi | F16D 48/066 |
| 2020/0309258 | A1 | 10/2020 | McKinzie et al. | |
| 2023/0406273 | A1 | 12/2023 | Love | |

FOREIGN PATENT DOCUMENTS

| | | | | |
|---|---|---|---|---|
| CN | 101709776 | A * | 5/2010 | F16H 57/04 |
| CN | 114194021 | A1 | 3/2022 | |

OTHER PUBLICATIONS

Translation CN776 (Year: 2010).*

* cited by examiner

*Primary Examiner* — Huan Le

(74) *Attorney, Agent, or Firm* — KLINTWORTH & ROZENBLAT LLP

(57) ABSTRACT

A clutch cooling system for a work vehicle manages pressurized hydraulic fluid to cool transmission friction clutches. The system includes a hydraulic accumulator that harvests and stores pressurized fluid from vehicle hydraulic circuits, a flow controller regulating fluid delivery, temperature sensors monitoring the clutches, and a control unit. Based on monitored temperatures, the control unit commands the flow controller to deliver stored pressurized fluid from the accumulator through the clutch cooling circuit to cool friction discs within the clutches. This system enables enhanced cooling during high-demand operations by utilizing previously harvested hydraulic pressure. The system's higher available pressure enables utilization of existing lubrication passages within transmissions, facilitating integration without requiring modifications to flow passages, while maintaining compatibility with existing transmission architectures.

20 Claims, 4 Drawing Sheets

HIGH-PRESSURE HYDRAULIC CLUTCH COOLING SYSTEM FOR WORK VEHICLES

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure pertains to cooling driveline components in work vehicles.

BACKGROUND OF THE DISCLOSURE

High-performance and heavy-duty work vehicles that move or carry heavy loads have driveline components that may generate substantial heat during operation, for example, in various clutches and brakes. If this heat is not properly managed, it can result in overheating, which may cause a decline in efficiency, accelerated wear, and lead to premature failure of these components. Conventional cooling systems, which rely on low-pressure or passive cooling mechanisms, may be insufficient, especially during extreme loading events or prolonged heavy use, to maintain the necessary operational temperatures.

SUMMARY OF THE DISCLOSURE

According to some embodiments, the present disclosure is directed to a clutch cooling system for a transmission of a work vehicle. The clutch cooling system also includes a hydraulic accumulator configured to accumulate pressurized hydraulic fluid, the pressurized hydraulic fluid being harvested from a high-pressure hydraulic circuit of the work vehicle or other hydraulic circuits of the work vehicle during operation; a flow controller in fluid communication with the hydraulic accumulator and the clutch cooling circuit, a sensor configured to monitor a temperature at the friction clutch, and a control unit having a processor and memory architecture configured to execute instructions to command operation of the flow controller based on the monitored temperature to deliver the pressurized hydraulic fluid from the hydraulic accumulator to the friction clutch to cool the friction discs. Other embodiments of this aspect include corresponding computer systems, apparatus, and computer programs recorded on one or more computer storage devices, each configured to perform the actions of the methods.

Implementations may include one or more of the following features. The clutch cooling system where the hydraulic accumulator is configured to harvest the pressurized hydraulic fluid from the high-pressure hydraulic circuit during normal operation of the work vehicle. One of the other hydraulic circuits of the work vehicle includes a loader boom cylinder. The hydraulic accumulator receives the pressurized hydraulic fluid during a backdriving event. The clutch cooling system may include a hydraulic cooler hydraulically coupled to the clutch cooling system to cool the pressurized hydraulic fluid. The shaft includes flow passages in communication with the clutch cooling system through which the pressurized hydraulic fluid is delivered to the friction discs at a nominal flow condition. The control unit is configured to deliver the pressurized hydraulic fluid from the hydraulic accumulator to the flow passages of the shaft when the monitored temperature is above a threshold temperature, resulting in an enhanced flow condition having a greater flow rate, volume, or pressure than the nominal flow condition. The transmission includes additional friction clutches hydraulically coupled to the clutch cooling system, and the control unit is configured to direct the pressurized hydraulic fluid from the hydraulic accumulator to cool friction discs of the additional friction clutches. The control unit is configured to prioritize cooling of one of the additional friction clutches while another of the additional friction clutches is engaged. The control unit is configured to selectively direct the pressurized hydraulic fluid to cool the friction clutch or the additional friction clutches according to which is experiencing a highest operational demand or temperature. Implementations of the described techniques may include hardware, a method or process, or computer software on a computer-accessible medium.

One general aspect includes a transmission for a work vehicle. The transmission also includes a gear train; a friction clutch configured to transmit power from the gear train; a clutch cooling system delivering pressurized hydraulic fluid to the friction clutch, the clutch cooling system may include: a hydraulic accumulator configured to accumulate pressurized hydraulic fluid, the pressurized hydraulic fluid being harvested from a high-pressure hydraulic circuit of the work vehicle or other hydraulic circuits of the work vehicle during operation; a flow controller in fluid communication with the hydraulic accumulator; a sensor configured to monitor a temperature at the friction clutch; and a control unit having a processor and memory architecture configured to execute instructions to command operation of the flow controller based on the monitored temperature to deliver the pressurized hydraulic fluid from the hydraulic accumulator to the friction clutch to cool the friction clutch. Other embodiments of this aspect include corresponding computer systems, apparatus, and computer programs recorded on one or more computer storage devices, each configured to perform the actions of the methods.

Implementations may include one or more of the following features. The transmission where the hydraulic accumulator is configured to harvest the pressurized hydraulic fluid from the high-pressure hydraulic circuit during normal operation of the work vehicle. One of the other hydraulic circuits includes a loader boom cylinder. The transmission may include a hydraulic cooler coupled to the clutch cooling system to reduce the temperature of the pressurized hydraulic fluid. The transmission includes additional friction clutches, each friction clutch having friction discs carried by a shaft, and each friction clutch configured for independent cooling based on monitored operational parameters. The control unit is configured to deliver the pressurized hydraulic fluid from the hydraulic accumulator to cool friction discs of one of the additional friction clutches while another one of the additional friction clutches is engaged for braking or power transmission. The control unit is configured to prioritize cooling of the friction clutch or the additional friction clutches based on a highest operational demand or temperature. The flow controller is an electrohydraulic valve controlled by the control unit to selectively regulate hydraulic fluid flow to the friction clutch. Implementations of the described techniques may include hardware, a method or process, or computer software on a computer-accessible medium.

The work vehicle can also include a chassis supported by ground-engaging wheels or tracks; a transmission carried by the chassis and having a gear train and multiple friction clutches configured to transmit power from the gear train; and a clutch cooling system delivering pressurized hydraulic fluid to the multiple friction clutches, the pressurized hydraulic fluid being harvested from a high-pressure hydraulic circuit of the work vehicle or other hydraulic circuits of the work vehicle during operation, each of the multiple friction clutches having a friction pack carried by a shaft, the clutch cooling system may include: a hydraulic accumulator configured to accumulate pressurized hydraulic fluid, the pressurized hydraulic fluid being harvested from a high-pressure hydraulic circuit of the work vehicle or other hydraulic circuits of the work vehicle during operation; a flow controller in fluid communication with the hydraulic accumulator and the clutch cooling system; a sensor configured to monitor a temperature at each of the multiple friction clutches; and a control unit having a processor and memory architecture configured to execute instructions to command operation of the flow controller based on the monitored temperature to deliver the pressurized hydraulic fluid from the hydraulic accumulator to each of the multiple friction clutches to cool the friction pack. Other embodiments of this aspect include corresponding computer systems, apparatus, and computer programs recorded on one or more computer storage devices, each configured to perform the actions of the methods.

Implementations may include one or more of the following features. The work vehicle where the control unit is configured to selectively cool a friction clutch of the multiple friction clutches experiencing a highest operational demand or temperature by controlling a flow of the pressurized hydraulic fluid from the hydraulic accumulator. Implementations of the described techniques may include hardware, a method or process, or computer software on a computer-accessible medium.

The details of one or more embodiments are set forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
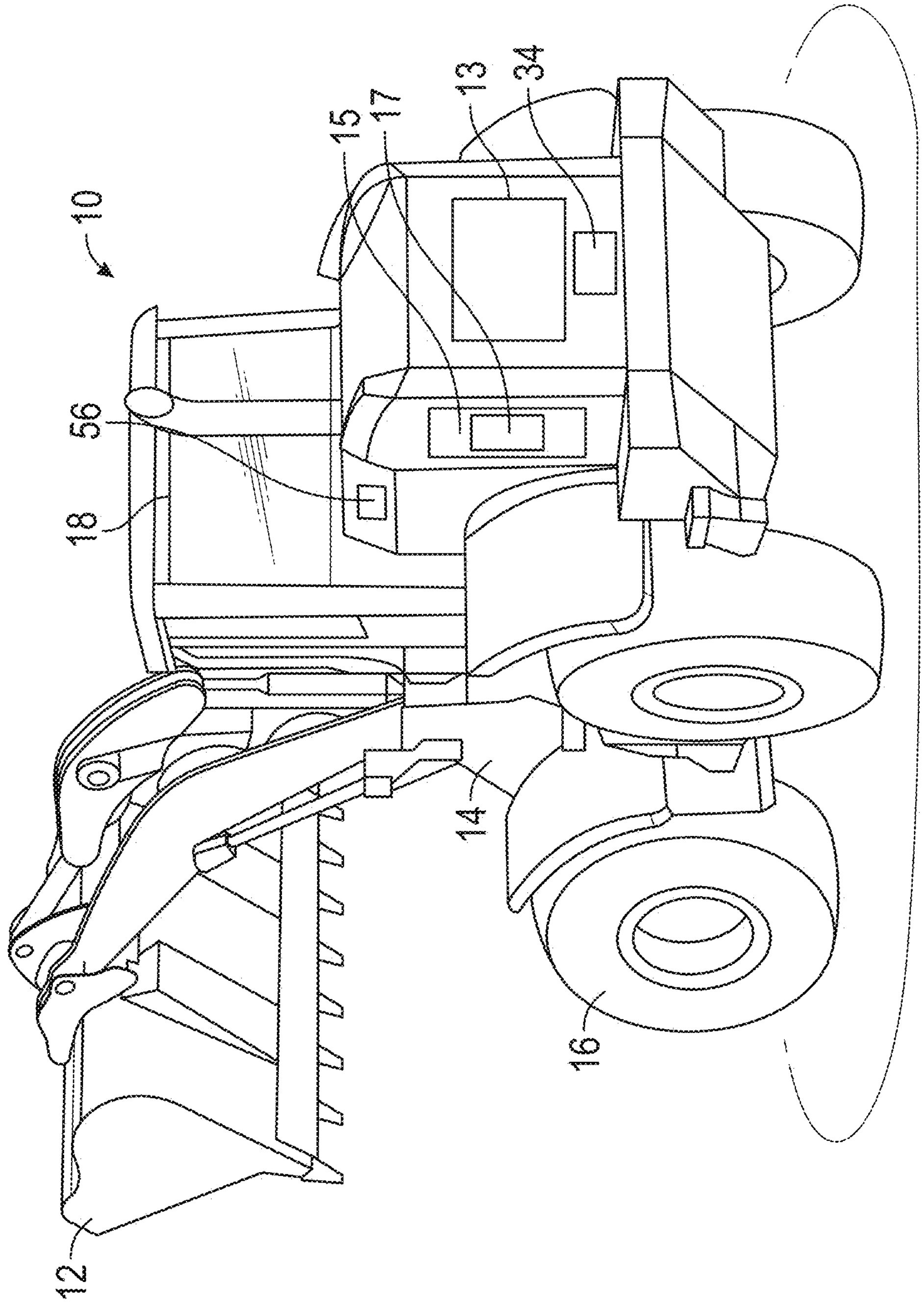
FIG. 1 is a perspective view of an example work vehicle that can be used to implement embodiments of the present disclosure.

Like reference symbols in the various drawings indicate like elements. For simplicity and clarity of illustration, descriptions, and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set forth in the appended claims.

Overview

The present disclosure pertains to systems designed to enhance clutch cooling in work vehicles. One configuration includes a high-pressure hydraulic clutch cooling system that improves efficiency and performance during braking events, power shifts, and other high-demand operations. These systems leverage hydraulic accumulators and control mechanisms to optimize cooling without requiring significant modifications to existing transmission systems.

The disclosed system employs a hydraulic accumulator to harvest (e.g., capture and store) excess circulating hydraulic fluid pressure generated during braking, power shifts, or other hydraulic operations that would typically be wasted by being recirculated back to a low-pressure tank or reservoir. Instead, the harvested hydraulic fluid is used to provide additional cooling capacity to the driveline during high thermal load events, such as intense braking or power shifts, including during transmission "four squaring" events. By harnessing this pressurized fluid from the vehicle's hydraulic circuits, whether during normal operation or during high thermal load events, the disclosed system ensures that a reserve of high-pressure fluid is available upon demand for productive use in cooling the driveline. This enhances cooling efficiency and capacity, thereby improving the capacity of the driveline components, without requiring larger or additional hydraulic pumps or significant redesigns of the work vehicle's driveline, thereby making it adaptable to existing work vehicle architectures.

The system's ability to leverage existing lubrication passages within the transmission is achieved through its utilization of higher available pressure from the work vehicle's existing or standard hydraulic circuit(s). This approach enables robust cooling performance without requiring modifications to existing flow passage geometries or cross-sectional areas. The higher-pressure differential creates enhanced flow characteristics through the standard lubrication circuits, eliminating the need for enlarged passages or additional drilling operations that would typically be required to increase cooling capacity. This design philosophy supports straightforward integration across various transmission architectures while maintaining the original lubrication system configuration, significantly reducing implementation complexity and enabling practical retrofitting opportunities for existing transmission designs. By utilizing standard flow passages more efficiently through elevated pressure, the system achieves superior cooling performance within the physical constraints of conventional transmission castings and components.

In various examples, the system includes a control unit equipped with a processor and memory architecture that receives input from sensors placed at one or more components of the driveline, such as at one or more friction clutches in a transmission. Sensors associated with a clutch sense various parameters (e.g., temperature, pressure, flow rate, and the like) of the driveline component or the hydraulic circuit associated therewith. In one example, based on the monitored temperature, the control unit may dynamically adjust the flow of hydraulic fluid through a flow controller (e.g., an electrohydraulic valve). The flow controller regulates the delivery of pressurized fluid from the hydraulic accumulator to one or more of the clutches to increase the pressure and flow of fluid during high thermal load conditions in order to provide enhanced cooling of the clutch.

In some cases, the system integrates seamlessly with existing hydraulic circuits of the work vehicle using the existing configurations of driveline components. For example, high pressure hydraulic fluid flow stored in the accumulator can be delivered through existing small shaft passages within a clutch of a transmission. This enhanced flow, triggered by monitored temperature thresholds (or other thresholds associated with other parameters), ensures that the clutch remains adequately cooled, such as during high-energy braking and power shifts. The hydraulic accumulator allows for greater flow rate and pressure of the fluid, which improves cooling without the need for upsizing major hydraulic components. Additionally, a hydraulic cooler may be included upstream of the accumulator to reduce the temperature of the hydraulic fluid before it is delivered to the driveline components.

The disclosed system may also provide selective cooling for multiple friction clutches. The control unit may be configured to prioritize the cooling of modulated clutches, while other clutches remain engaged, based on operational demand and temperature conditions. This feature is particularly useful during complex operations such as braking or power shifts, where cooling demand may vary across multiple clutches. The control unit ensures that the clutch experiencing the highest operational demand or temperature receives the necessary cooling first.

The present disclosure is particularly well-suited for transmission systems that employ "four squaring" techniques in which two clutches are modulated to temporarily engage simultaneously so as to create internal resistance within the transmission to slow the work vehicle without fully disengaging the drivetrain. Such four squaring can generate high thermal loads on the modulated clutches during such deceleration events that may lead to premature wear if not sufficiently cooled. Using the disclosed system, high pressure hydraulic fluid can be delivered readily from the accumulator to the clutches sufficient to reduce or prevent overheating.

Additionally, these systems enhance cooling performance by backdriving events in which a hydraulic pump transfers hydraulic fluid from the transmission to the accumulator, which may then be stored for future use. This stored hydraulic fluid is then available during subsequent high-demand braking or shifting events, ensuring that sufficient pressurized oil is available to cool the clutch packs as needed.

The following description provides a detailed explanation of the embodiments and should be understood as a non-limiting example context for better understanding the present disclosure.

Example High Pressure Hydraulic Clutch Cooling System for Work Vehicles

Referring to FIG. 1, an example work vehicle 10 in the form of a self-propelled manned or autonomous wheel loader houses or otherwise supports a work implement in the form of a boom and bucket 12. The work vehicle 10 may include a vehicle frame or chassis 14 supporting the boom and bucket 12 and that is supported off the ground by a plurality of ground-engaging members 16 (e.g., wheels or tracks) and which may also support an operator cab 18 in the case of a manned work vehicle.

The work vehicle 10 can include an engine 13, a hydraulic system 15, a transmission 34, and a control circuit 56. The engine 13 drives a power train pump 22 (see FIG. 2) of the hydraulic system 15, which supplies pressurized hydraulic fluid to hydraulic motors that power components such as the boom and bucket 12.

Additional hydraulic pumps of the hydraulic system 15 may be driven by the gear train 80 within transmission 34, providing hydraulic pressure for implements, steering, and braking functions. The hydraulic motors connect to the gear train 80, which transfers power through an output shaft 81 to the ground-engaging members 16. This hydrostatic drive configuration allows for precise control of work vehicle 10 movement while enabling power management during braking events. The hydraulic system 15 maintains pressure and circulation to power hydraulic implements, lubricate mechanical components, and cool drivetrain elements through a network of pumps, accumulators, and control valves. In sum, the hydraulic system 15 manages fluid flow throughout the work vehicle 10. The hydraulic system 15 maintains pressure and circulation to power hydraulic implements (such as the boom and bucket 12 and the ground-engaging members 16), lubricate mechanical components, and cool drivetrain elements (such as friction clutches). The hydraulic system 15 can include a clutch cooling system that includes an accumulator, and flow controller, and control valves that adjust fluid pressure and flow rates to friction clutches in the transmission 34, as disclosed herein with reference to FIG. 2.

The transmission 34 connects the hydraulic motors of the hydraulic system 15 to the ground-engaging members 16. It includes multiple friction clutches that engage and disengage for speed control and power management. These clutches heat up during operation, especially during high-load events or when used for braking.

The control circuit 56 coordinates these systems by monitoring conditions and managing their interactions. It uses sensors and electronic controls to monitor engine output, hydraulic pump performance, hydraulic motor status, system pressure, and transmission temperature, adjusting operations to protect components. For clutch cooling specifically, the control circuit 56 monitors transmission 34 (and specifically friction clutches therein) temperatures and can direct high-pressure hydraulic fluid from a clutch cooling system (see FIG. 2) to cool transmission components when needed.

Figure 2:
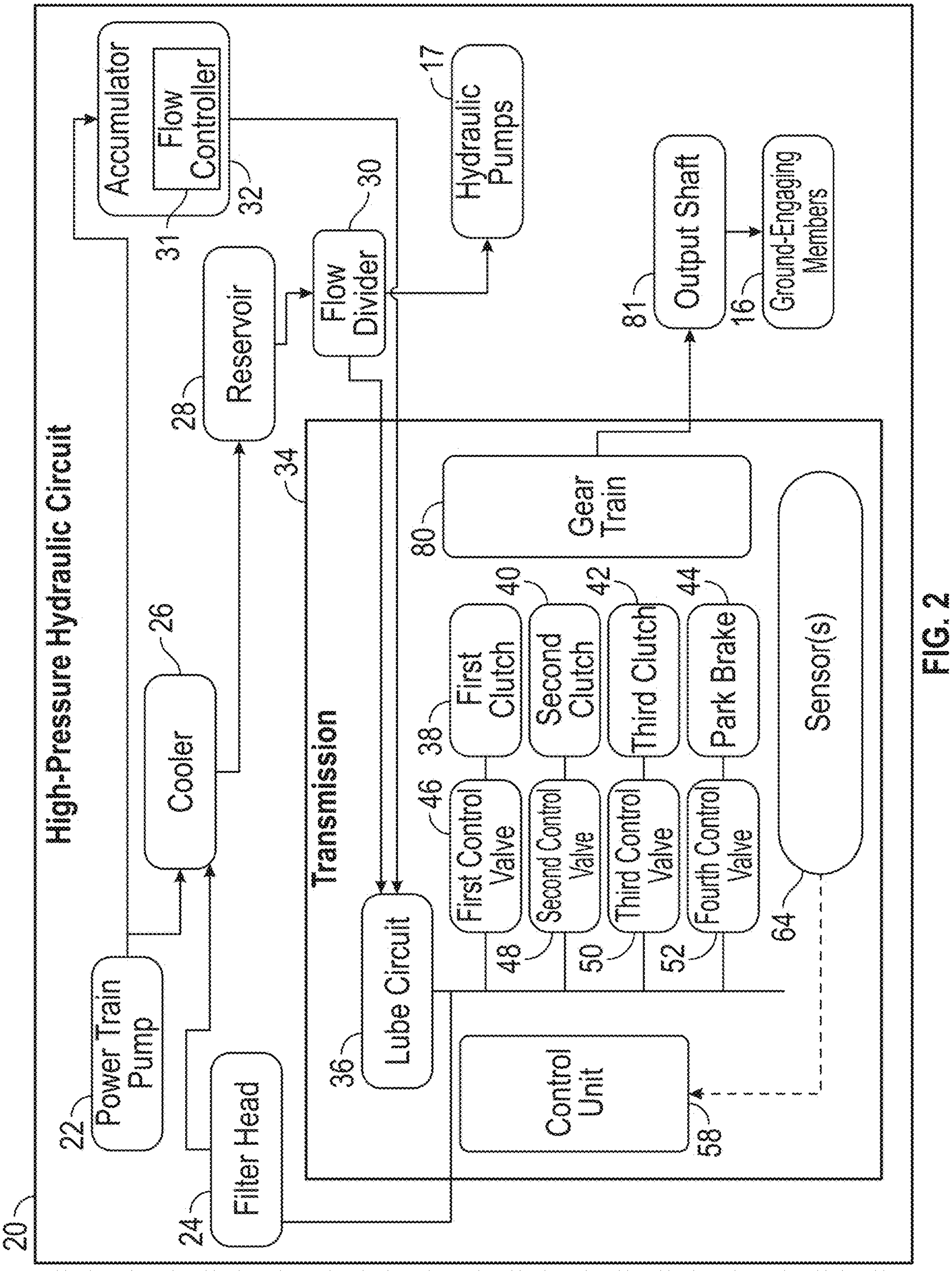
FIGS. 2 and 3 are schematic diagrams of example hydraulic and control circuits for a driveline of the work vehicle of FIG. 1.

Referring now also to FIG. 2, the hydraulic system 15 includes a high-pressure hydraulic circuit 20 that controls hydraulic fluid flow, pressure regulation, cooling, and lubrication for a work vehicle's transmission system, and also to provide the high-pressure clutch cooling features disclosed herein. The high-pressure hydraulic circuit 20 includes example components such as a power train pump 22, filter head 24, cooler 26, reservoir 28, flow divider 30, and accumulator 32. These components are arranged to manage fluid pressure, flow rate, and temperature, ensuring the efficient operation of the transmission during high-demand events, such as braking, power shifts, and heavy-load conditions. This system mitigates overheating and provides adequate lubrication to driveline components to improve the longevity and performance of the transmission 34.

The operating conditions and parameters described herein serve as examples to aid understanding. Different work vehicle configurations may use other operating conditions, including different flow rates, pressures, temperatures, and control thresholds, depending on their specific design requirements and applications.

In more detail, the power train pump 22 delivers pressurized hydraulic fluid to various subsystems within the transmission 34 and other parts of the work vehicle 10, maintaining a continuous supply of hydraulic fluid for lubrication and cooling. The power train pump 22 operates at a flow rate of approximately 29 gallons per minute (GPM) under normal conditions, which is sufficient to meet the lubrication and cooling needs of the transmission 34 during standard and high-demand operations. The pressures which the power train pump 22 operate can vary according to work vehicle configurations and demands.

In some scenarios, the system operates at a baseline pressure of approximately 270 psi, however this baseline pressure is reduced to individual operating pressures for each component of the work vehicle, such as the friction clutches in the transmission. In some instances, this higher baseline pressure hydraulic fluid produced by the power train pump 22 can by captured in an accumulator for enhanced cooling performance.

Hydraulic fluid from the power train pump 22 can be routed through the filter head 24, which is responsible for removing contaminants from the fluid to ensure the long-term reliability of the system. The filter head operates with a bypass spring setting of 5.2 bar (75.0 psid) and a filter restriction switch that activates at 3.5 bar (50 psid), ensuring that the hydraulic system remains operational during high-flow conditions and prevents filter clogging. Again, these operational details are not meant to be limiting and are for descriptive purposes. The filtered hydraulic fluid is then directed towards downstream components of the work vehicle.

The hydraulic fluid can be routed through a cooler 26, which is equipped with a thermal bypass valve. This valve operates within a pressure range of 5-9 bar (85 psid) and fully opens at a fluid temperature of 74° C., allowing the system to optimize cooling only when necessary. When the temperature is below the threshold, the thermal bypass valve allows fluid to bypass the cooler, optimizing energy use and preventing unnecessary cooling under low-temperature conditions.

After passing through the cooler 26, the hydraulic fluid enters the reservoir 28, which stores the fluid and provides an adequate supply to the hydraulic system such as to a lube circuit that services the transmission. The reservoir 28 also facilitates passive cooling as the fluid is stored before being recirculated. The hydraulic fluid then flows to the flow divider 30, which is responsible for distributing hydraulic fluid to various subsystems. The flow divider 30 may include a system relief valve that operates at 190 psi to prevent over-pressurization and protect system components.

Baseline high pressure produced by the power train pump 22, or high-pressure created during high-demand events, such as heavy braking or power shifts, can be captured in the accumulator 32 and stored. This pressurized fluid is held in reserve and released during high-temperature events to support additional cooling and lubrication of the transmission. The accumulator 32 stores the excess hydraulic fluid generated under high pressure and releases it when necessary to supplement the cooling.

As noted above, the work vehicle 10 comprises the transmission 34 that is used to transfer power from the engine 13 to the work vehicle's drivetrain, enabling controlled movement and operation under varying load conditions.

The transmission 34 generally includes a lube circuit 36 that delivers hydraulic fluid to the various clutches, including the first clutch 38, second clutch 40, third clutch 42, and park brake 44. The transmission can include fewer or more friction clutches that those shown. Each friction clutch may be configured to engage at different speed ranges. For instance, the first clutch 38 may correspond to a low-speed clutch, the second clutch 40 may correspond to a mid-speed clutch, and the third clutch 42 may correspond to a high-speed clutch.

These friction clutches are each connected to corresponding control valves, including the first control valve 46, second control valve 48, third control valve 50, and fourth control valve 52. These control valves regulate the flow of hydraulic fluid to their respective clutches, ensuring proper cooling and operation. Hydraulic fluid flows through passages within each clutch, dissipating heat generated by friction and maintaining optimal operating temperatures.

The high-pressure hydraulic circuit 20 is designed to provide hydraulic fluid to the friction clutches to support both cooling and lubrication during vehicle operation. During high-demand events such as power shifts or braking, a control unit senses a high-temperature condition in any one of the friction clutches and communicates with the flow controller 31 to cause the accumulator 32 to release high-pressure hydraulic fluid to the friction clutches, helping manage heat and ensuring optimal performance. This balance of pressure regulation, cooling, and lubrication ensures that the transmission and clutch systems operate efficiently, even under high-load conditions.

The high-pressure hydraulic circuit 20 includes a clutch cooling system comprising the accumulator 32, flow control valves (first control valve 46, second control valve 48, third control valve 50), friction clutches (first clutch 38, second clutch 40, third clutch 42), control unit 58, and sensor(s) 64. This clutch cooling system provides high-pressure hydraulic fluid to any of the first clutch 38, second clutch 40, and/or the third clutch 42 upon the determination of any of a high-intensity braking event, a high-temperature condition within any one of the friction clutches, which can include instances where the friction clutches are being used in a four squaring operation in order to retard the movement of the work vehicle. In sum, the control unit 58 can command operation of the flow controller 31 based on the monitored temperature of one or more friction clutches in the transmission to deliver the pressurized hydraulic fluid from the hydraulic accumulator 32 to the one or more friction clutches to cool the friction discs thereof.

It will also be understood that the accumulator 32 receives hydraulic fluid from a high-pressure hydraulic circuit of the work vehicle during operation. For example, the accumulator 32 can receive baseline high-pressure from the power train pump 22. In another embodiment, high-pressure hydraulic fluid can be stored in the accumulator 32 from a clutch hydraulic circuit (lube circuit 36 and friction clutches 38, 40, 42) during events such as four squaring or backdriving. When the work vehicle is backdriven, a pump, such as the power train pump 22, is engaged to pump the hydraulic fluid from the transmission into the accumulator 32 for subsequent use in cooling the friction clutch. Another example high-pressure hydraulic circuit includes a loader boom cylinder.

Figure 3:
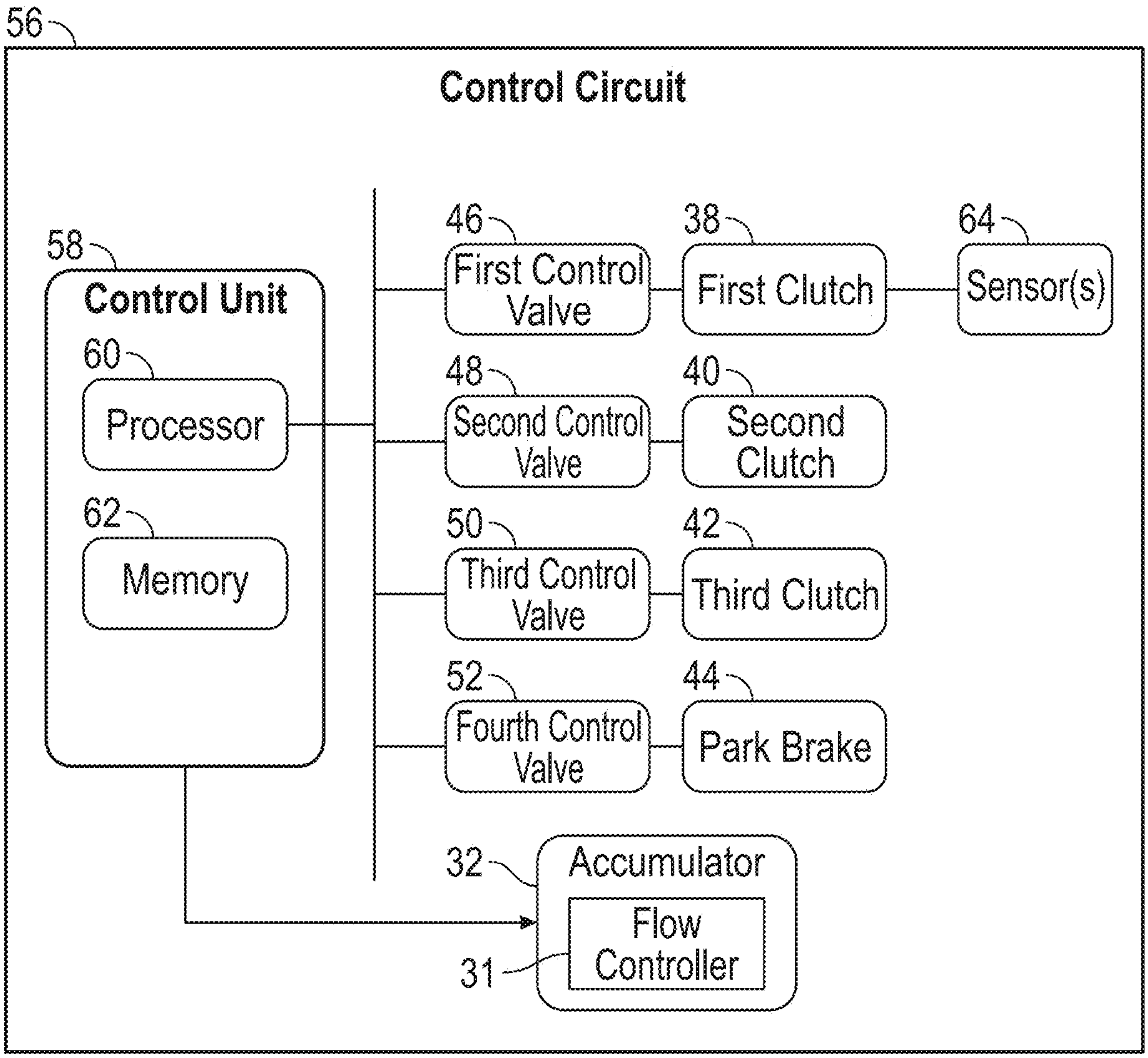

Referring now to FIG. 3, the control circuit 56 is responsible for managing the flow of pressurized hydraulic fluid to the friction clutches, regulating cooling based on various sensed operational parameters. The control circuit includes a control unit 58, a processor 60, a memory 62, sensor(s) 64, a flow controller 31 associated with the accumulator 32, and a set of control valves (first control valve 46, second control valve 48, third control valve 50, and fourth control valve 52), each of which is configured to direct high-pressure hydraulic fluid from the accumulator 32 to one or more of the friction clutches.

The processor 60 is configured to execute instructions stored in the memory 62, which may include algorithms for controlling the flow of hydraulic fluid 32 based on real-time operational conditions. The control unit 58 can execute commands to regulate the delivery of hydraulic fluid from the hydraulic accumulator to the friction clutches, adjusting the cooling provided to each clutch according to the temperature data received from the sensor(s) 64. In certain embodiments, the memory 62 stores temperature thresholds and flow control parameters, determining when and how much hydraulic fluid should be delivered to cool the friction clutches. To be sure, in some embodiments, each friction clutch can be associated with a unique sensor. For example, each friction clutch can have a dedicated temperature sensor.

The sensor(s) 64 are configured to monitor the temperature at one or more friction clutches 38, 40, 42, providing real-time temperature data to the control unit 58. Based on the monitored temperature, the control unit 58 adjusts the operation of the flow controller 31 and various control valves (first control valve 46, second control valve 48, third control valve 50). In some embodiments, the sensor(s) 64 measure the temperature of friction discs within the clutches to help the system maintain proper cooling conditions. When the temperature exceeds a predetermined threshold, the control unit can activate the flow controller 31 to deliver pressurized hydraulic fluid from the accumulator 32, ensuring that the clutches are sufficiently cooled to prevent overheating during high-load operations.

The flow controller 31, which may be an electrohydraulic valve in some embodiments, is in fluid communication with the hydraulic accumulator 32 and the clutch hydraulic circuit, such as the lube circuit. The flow controller 31 regulates the flow of pressurized hydraulic fluid to the friction clutches 38, 40, 42. The control unit dynamically adjusts the flow controller's operation based on real-time feedback from the sensor(s) 64, modulating the hydraulic fluid flow rate, volume, or pressure to meet the cooling demands of the clutches. In some embodiments, the flow controller 31 is configured to deliver varying amounts of hydraulic fluid depending on the operational state of the transmission and the thermal load on the friction clutches.

The control valves 46, 48, and 50 are responsible for directing hydraulic fluid to the individual clutches. The first control valve 46 directs fluid to the first clutch 38, the second control valve 48 directs fluid to the second clutch 40, the third control valve 50 directs fluid to the third clutch 42, and the fourth control valve 52 controls fluid flow to the park brake 44. These valves are activated by the control unit 58 based on operational parameters, such as temperature, clutch engagement status, or braking events. In some embodiments, the control unit prioritizes cooling for clutches under the highest operational demand or those experiencing elevated temperatures. For instance, during clutch modulation where one clutch is modulated while another remains engaged, the control unit may prioritize cooling of the modulated clutch to mitigate heat buildup.

Additionally, the control circuit 56 manages the flow of pressurized hydraulic fluid from the accumulator 32. In some embodiments, the accumulator 32 stores fluid captured from the vehicle's high-pressure hydraulic circuits, such as a loader boom cylinder or other auxiliary hydraulic systems. The control unit 58 monitors both the fluid pressure and temperature in the accumulator 32, ensuring that fluid is delivered to the friction clutches when additional cooling is required, such as during braking events, power shifts, or backdriving conditions. This stored hydraulic fluid can be released into the clutch hydraulic circuit through the flow controller 31 and control valves 46, 48, and/or 50 when the control unit 58 detects a need for enhanced cooling.

The control unit 58 operates systematically by utilizing real-time sensor data to dynamically adjust the flow of pressurized hydraulic fluid, helping to maintain the friction clutches and park brake within their optimal temperature range. The combination of the control unit 58, the flow controller 31, and the control valves ensures that cooling priorities are managed based on operational demand, preventing overheating during high-energy events and enhancing the performance and durability of the transmission system.

In one embodiment, the control unit 58 is employed to manage clutch cooling for multiple friction clutches within the transmission 34. During a "four squaring" technique, a first clutch 38 remains fully engaged to maintain power transmission, while a second clutch 40 is simultaneously temporarily modulated to create internal resistance, which slows the vehicle without disengaging the drivetrain. This simultaneous engagement of the first clutch 38 and the second clutch 40 may generate significant heat in the friction discs in one or both clutches 38, 40.

During four squaring, for example, the control unit 58 monitors the temperature of the friction discs in both the first clutch 38 and the second clutch 40 via the sensor(s) 64, which continuously provides real-time temperature data to the control unit 58. If the temperature of either clutch exceeds a predetermined threshold, the control circuit activates the flow controller 31, directing pressurized hydraulic fluid from the accumulator to the clutch hydraulic circuit to provide enhanced cooling. The control circuit can prioritize cooling for the second clutch 40, which generates more heat due to the modulation process. The second control valve 48 opens to deliver additional cooling fluid to the second clutch 40, preventing overheating during four squaring.

By adjusting fluid flow dynamically in response to operational conditions, the control unit 58 ensures that the second clutch 40 receives sufficient cooling during high-energy events, while maintaining adequate fluid flow to the first clutch 38. This helps to prevent excessive wear on the friction discs and supports efficient transmission operation under the increased thermal load caused by four squaring.

In some embodiments, hydraulic fluid is delivered at an increased flow rate, pressure, or volume from the accumulator during the four-squaring process. The sensor(s) 64 monitors the operational temperature, and if it exceeds average operating levels, the control unit adjusts the flow controller to provide enhanced cooling capacity. This helps to keep the friction clutches within safe operating temperatures, enabling the vehicle to perform effective braking or deceleration through the four squaring technique without risking damage to the transmission components.

In some instances, the control unit prioritizes the cooling of a modulated clutch when it is actively regulating power or deceleration, while another clutch remains engaged. This prioritization is determined based on real-time operational demands and temperature data, ensuring that the modulated clutch receives necessary cooling to prevent overheating and maintain system performance.

For example, control unit 58 can be configured to prioritize the cooling of the first clutch 38 when it is modulated, while the second clutch 40 remains engaged. The control unit 58 monitors the temperature of both the first clutch 38 and the second clutch 40 through sensor(s) 64, which is positioned near the friction discs. When the first clutch 38 is modulated to provide controlled resistance or deceleration, the control unit 58 directs hydraulic fluid from the accumulator 32 to the first clutch 38 to enhance cooling.

The control unit 58 dynamically adjusts the flow controller 31 and activates the first control valve 46 to regulate the flow of hydraulic fluid to the first clutch 38. During this process, the second clutch 40 remains engaged but receives less cooling priority, as the thermal demand on the first clutch 38 is higher due to modulation. By prioritizing cooling to the first clutch 38, the system prevents overheating of the friction discs and ensures optimal transmission performance. This process is based on real-time operational demand and monitored temperature, allowing the system to respond dynamically during high-demand events, such as braking or power shifts.

Figure 4:
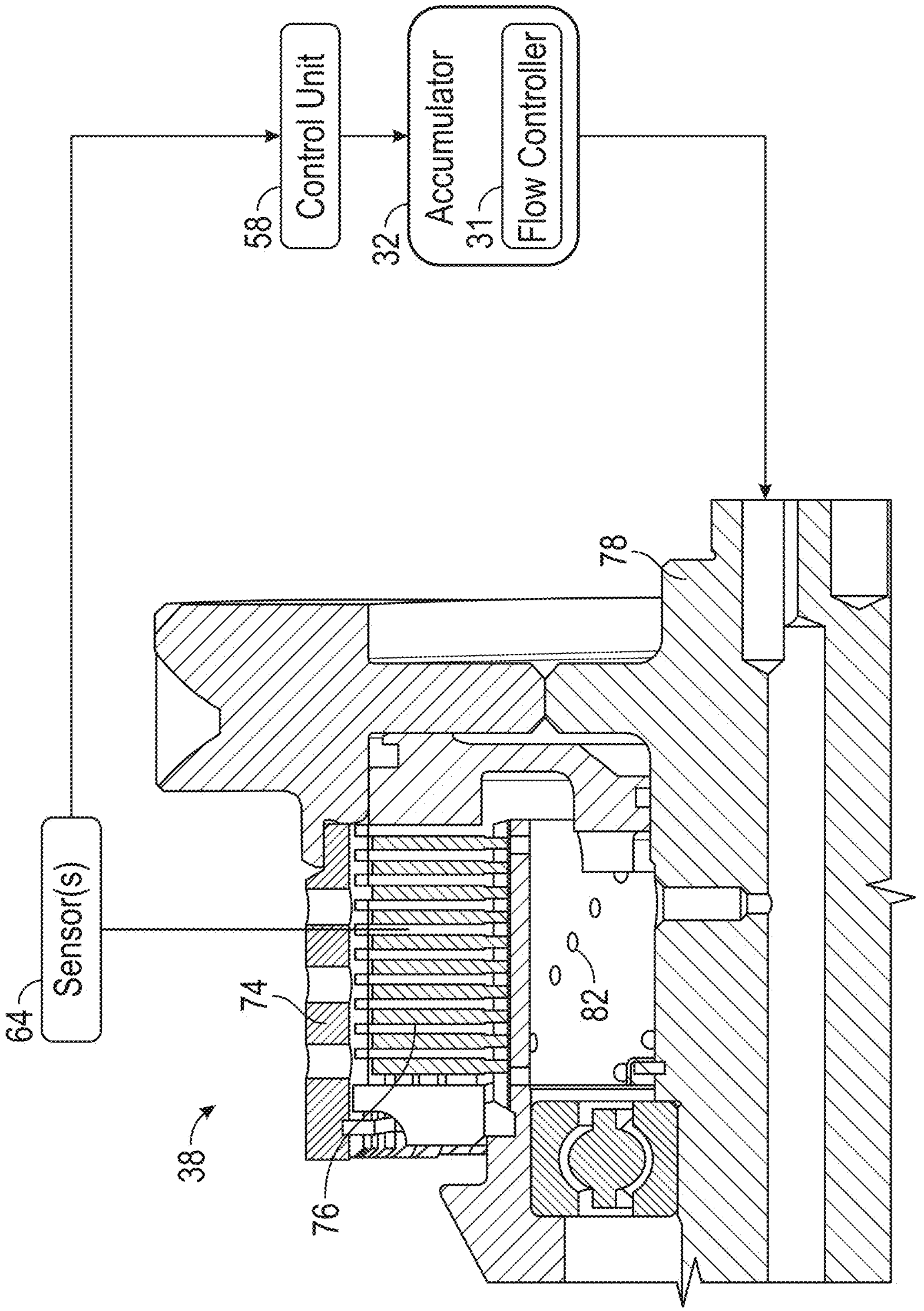
FIG. 4 is a simplified sectional view of an example clutch, shown with the sensors, control unit, and hydraulic accumulator of the hydraulic and control circuits.

Referring now also to FIG. 4, the first clutch 38 has a friction pack 74 having friction discs 76 is carried on a shaft 78. The shaft 78 can be coupled to the gear train 80 that provides rotational power to the ground-engaging members 16 through an output shaft 81. In some configurations, the shaft 78 is ported to provide hydraulic fluid to the friction discs 76 through flow passages 82. These flow passages 82 are used both to lubricate the friction discs 76 during normal operating conditions, as well as during events where higher pressured hydraulic fluid is delivered.

For example, the control unit 58 is configured to deliver the pressurized hydraulic fluid from the hydraulic accumulator 32 to flow passages 82 of the shaft 78 when the monitored temperature is above a threshold temperature, resulting in an enhanced flow condition having a greater flow rate, volume, or pressure than the nominal flow condition. In one embodiment, when the sensor(s) 64 determine that a high-temperature condition exists in the first clutch 38, the control unit 58 can control the flow controller 31 to cause the accumulator 32 to release high-pressure hydraulic fluid into the shaft 78 and through the flow passages 82, thereby cooling the friction discs 76. As noted above, the control unit 58 can maintain temperature tolerances for both nominal operations, and tolerances for high-temperature conditions. Thus, a typical rise in clutch temperature would not trigger the control unit 58 to release high-pressure hydraulic fluid from the accumulator, but such a release would only happen when the temperature was at an extreme.

As noted above, during ordinary operating conditions of the work vehicle 10, the power train pump 22 produces a baseline, high-pressure hydraulic flow at around 270 PSI. This higher pressure is stepped down by a flow diverter to an operating pressure in the lube circuit that is a lower pressure than 270 PSI. The exact flow condition for each friction clutch can vary according to the operating parameters of the friction clutch. For example, one type of clutch may operate at a pressure of 25 PSI. When in a high-temperature condition, high-pressure stored hydraulic fluid in the accumulator 32 can be directed into that same clutch at a higher pressure than 25 PSI. The exact pressure used to cool that friction clutch can depend upon several parameters, such as the severity of the heating and/or the structural/operational tolerances of the friction clutch. For example, the friction clutch may only be able to accept a certain volume or flow rate of hydraulic fluid due to the size of the flow passages 82. Adding pressure above the capabilities of the friction clutch may cause damage to the friction clutch or other components of the high-pressure hydraulic circuit 20 that are in fluid communication with the friction clutch, such as the control valve coupled to the friction clutch. That is, the control unit 58 can maintain these maximum operating tolerances for each friction clutch, and modulate the flow controller 31 to release high pressure hydraulic fluid from the accumulator 32 that is within the operating tolerances of each friction clutch.

Conclusion

This disclosure outlines a clutch cooling system for hydraulic clutches in work vehicles designed to manage excess pressurized hydraulic fluid and optimize cooling during high-demand operations such as braking and power shifts. One example of the system incorporates a hydraulic accumulator, a flow controller, temperature sensors, and a control unit with a processor and memory architecture. The system captures and stores excess hydraulic pressure generated during braking or from other hydraulic circuits in the accumulator. The control unit, based on real-time temperature data provided by the sensors, for example, regulates the flow controller to precisely deliver pressurized hydraulic fluid to the clutch friction discs, ensuring effective cooling during periods of high thermal load.

The disclosed system improves the performance and reliability of the transmission by maintaining optimal hydraulic fluid pressure and reducing or preventing overheating of the clutch friction packs. The integration of temperature monitoring and dynamic control of hydraulic fluid flow addresses key challenges in clutch cooling, reducing frictional wear and extending the lifespan of transmission components. Additionally, the system's ability to adapt to varying operational conditions and its seamless integration with existing hydraulic circuits enhances vehicle efficiency and reduces maintenance requirements. These example clutch cooling systems not only improve work vehicle performance and reliability during demanding operations, but also supports the continuous operation of the transmission system under extreme thermal loading.

As utilized herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C). Also, the use of "one or more of" or "at least one of" in the claims for certain elements does not imply other elements are singular nor has any other effect on the other claim elements.

As utilized herein, the singular forms "a", "an," and "the" are intentionally-grown to include the plural forms as well, unless the context clearly indicates otherwise. It will be further understood that the terms "comprises" and/or "comprising," when utilized in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intentionally-grown to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A clutch cooling system for a transmission of a work vehicle, the transmission having a friction clutch with friction discs carried by a shaft and coupled to a clutch hydraulic circuit delivering hydraulic fluid to the friction discs, the clutch cooling system comprising:
 a hydraulic accumulator of a high-pressure hydraulic circuit of the work vehicle other than the clutch hydraulic circuit of the transmission that powers a work implement of the work vehicle, the accumulator configured to harvest pressurized hydraulic fluid from the high-pressure hydraulic circuit for cooling the friction clutch of the clutch hydraulic circuit;
 a flow controller in fluid communication with the hydraulic accumulator and the clutch cooling circuit;
 a sensor configured to monitor a temperature at the friction clutch; and
 a control unit having a processor and memory architecture configured to execute instructions to command operation of the flow controller based on the monitored temperature to deliver the pressurized hydraulic fluid from the hydraulic accumulator to the friction clutch to cool the friction discs.

2. The clutch cooling system of claim 1, wherein the hydraulic accumulator is configured to harvest the pressurized hydraulic fluid from the high-pressure hydraulic circuit during normal operation of the work vehicle.

3. The clutch cooling system of claim 2, wherein the work implement of the work vehicle is a loader boom cylinder.

4. The clutch cooling system of claim 1, wherein the hydraulic accumulator receives the pressurized hydraulic fluid during a backdriving event.

5. The clutch cooling system of claim 1, further comprising a hydraulic cooler hydraulically coupled to the clutch cooling system to cool the pressurized hydraulic fluid.

6. The clutch cooling system of claim 1, wherein the shaft includes flow passages in communication with the clutch cooling system through which the pressurized hydraulic fluid is delivered to the friction discs at a nominal flow condition.

7. The clutch cooling system of claim 6, wherein the control unit is configured to deliver the pressurized hydraulic fluid from the hydraulic accumulator to the flow passages of the shaft when the monitored temperature is above a threshold temperature, resulting in an enhanced flow condition having a greater flow rate, volume, or pressure than the nominal flow condition.

8. The clutch cooling system of claim 1, wherein the transmission includes additional friction clutches hydraulically coupled to the clutch cooling system, and the control unit is configured to direct the pressurized hydraulic fluid from the hydraulic accumulator to cool friction discs of the additional friction clutches.

9. The clutch cooling system of claim 8, wherein the control unit is configured to prioritize cooling of one of the additional friction clutches while another of the additional friction clutches is engaged.

10. The clutch cooling system of claim 8, wherein the control unit is configured to selectively direct the pressurized hydraulic fluid to cool the friction clutch or the additional friction clutches according to which is experiencing a highest operational demand or temperature.

11. A work vehicle comprising:
 a transmission including:
  a gear train;
  a friction clutch configured to transmit power from the gear train; and
  a clutch hydraulic circuit powering the friction clutch; and
 a clutch cooling system delivering pressurized hydraulic fluid to the friction clutch, the clutch cooling system comprising:
  a hydraulic accumulator of a high-pressure hydraulic circuit of the work vehicle other than the clutch hydraulic circuit that powers a work implement of the work vehicle, the accumulator configured to harvest pressurized hydraulic fluid from the high-pressure hydraulic circuit for cooling the friction clutch of the clutch hydraulic circuit;
  a flow controller in fluid communication with the hydraulic accumulator;
  a sensor configured to monitor a temperature at the friction clutch; and
  a control unit having a processor and memory architecture configured to execute instructions to command operation of the flow controller based on the monitored temperature to deliver the pressurized hydraulic fluid from the hydraulic accumulator to the friction clutch to cool the friction clutch.

12. The work vehicle of claim 11, wherein the hydraulic accumulator is configured to harvest the pressurized hydraulic fluid from the high-pressure hydraulic circuit during normal operation of the work vehicle.

13. The work vehicle of claim 12, wherein the work implement is a loader boom cylinder.

14. The work vehicle of claim 11, further comprising a hydraulic cooler coupled to the clutch cooling system to reduce the temperature of the pressurized hydraulic fluid.

15. The work vehicle of claim 11, wherein the transmission includes additional friction clutches, each friction clutch having friction discs carried by a shaft, and each friction clutch configured for independent cooling based on monitored operational parameters.

16. The work vehicle of claim 15, wherein the control unit is configured to deliver the pressurized hydraulic fluid from the hydraulic accumulator to cool friction discs of one of the additional friction clutches while another one of the additional friction clutches is engaged for braking or power transmission.

17. The work vehicle of claim 16, wherein the control unit is configured to prioritize cooling of the friction clutch or the additional friction clutches based on a highest operational demand or temperature.

18. The work vehicle of claim 11, wherein the flow controller is an electrohydraulic valve controlled by the control unit to selectively regulate hydraulic fluid flow to the friction clutch.

19. A work vehicle comprising:
 a chassis supported by ground-engaging wheels or tracks;
 a transmission carried by the chassis and having a gear train and a clutch hydraulic circuit with multiple friction clutches configured to transmit power from the gear train; and
 a clutch cooling system delivering pressurized hydraulic fluid to the multiple friction clutches, the pressurized hydraulic fluid being harvested from a high-pressure hydraulic circuit other than the clutch hydraulic circuit that powers a work implement of the work vehicle, each of the multiple friction clutches having a friction pack carried by a shaft, the clutch cooling system comprising:

a hydraulic accumulator of the high-pressure hydraulic circuit configured to harvest the pressurized hydraulic fluid from the high-pressure hydraulic circuit for cooling the multiple friction clutches;

a flow controller in fluid communication with the hydraulic accumulator and the clutch cooling system;

a sensor configured to monitor a temperature at each of the multiple friction clutches; and a control unit having a processor and memory architecture configured to execute instructions to command operation of the flow controller based on the monitored temperature to deliver the pressurized hydraulic fluid from the hydraulic accumulator to each of the multiple friction clutches to cool the friction pack.

20. The work vehicle of claim 19, wherein the control unit is configured to selectively cool a friction clutch of the multiple friction clutches experiencing a highest operational demand or temperature by controlling a flow of the pressurized hydraulic fluid from the hydraulic accumulator.

* * * * *